United States Patent [19]

Bradenbaugh

[11] Patent Number: 5,209,368
[45] Date of Patent: May 11, 1993

[54] INSULATED TANK CONSTRUCTION AND IMPROVED SELF POSITIONING SEALING DEVICE FOR USE THEREIN

[76] Inventor: Kenneth A. Bradenbaugh, 7018 Turtle Rock Ct., Charlotte, N.C. 28277

[21] Appl. No.: 896,115

[22] Filed: Jun. 9, 1992

[51] Int. Cl.⁵ .............................................. B65D 90/00
[52] U.S. Cl. .................................... 220/448; 220/459; 126/361; 126/375
[58] Field of Search ...................... 220/444, 448, 459; 126/361, 375

[56] References Cited

U.S. PATENT DOCUMENTS

| | | | |
|---|---|---|---|
| 4,372,028 | 2/1983 | Clark et al. | 29/460 |
| 4,447,377 | 5/1984 | Denton | 264/45.2 |
| 4,477,399 | 10/1984 | Tilton | 264/45.2 |
| 4,875,272 | 10/1989 | Nelson | 29/451 |
| 4,878,482 | 11/1989 | Pfeffer | 126/375 |
| 4,890,762 | 1/1990 | Pfeffer | 220/444 |
| 4,956,909 | 9/1990 | Nelson | 29/451 |
| 4,972,967 | 11/1990 | Nelson | 220/444 |
| 4,979,637 | 12/1990 | Nelson | 220/452 |
| 5,024,210 | 6/1991 | Nelson | 126/344 |
| 5,040,697 | 8/1991 | Nelson | 220/444 |
| 5,163,214 | 11/1992 | Calero | 29/460 |

Primary Examiner—Joseph Man-Fu Moy
Attorney, Agent, or Firm—Douglas H. May

[57] ABSTRACT

An insulated tank construction for a water heater, including a cylindrical tank, a cylindrical shell placed around and spaced radially apart from the tank to form an annular space, and a ring-shaped form dam disposed circumferentially at a selected position in the annular space along the height of the tank. The foam dam is comprised of a resilient compressible material, preferably porous, open-cell polyurethane foam, and has an inner diameter less than the tank outer diameter and an outer diameter greater than the shell inner diameter. Thus, the foam dam is compressed into sealing engagement with both the tank wall and the shell wall. The shell inner wall, foam dam and tank outer wall form an annular chamber within the annular space. Expandable polymer foam material is injected into the annular chamber and expanded to form a jacket of insulating foam around the tank. Initially, gasses generated by expansion of the foam escape the annular chamber through the porous body of the foam dam. However, the fluid polymer foam will not flow through the porous body and the foam dam retains the foaming polymer within the annular chamber. For gas fired water heaters, which have a hot heating chamber at the bottom, the foam dam will prevent flammable polymer foam from contacting the heating chamber.

12 Claims, 2 Drawing Sheets

INSULATED TANK CONSTRUCTION AND IMPROVED SELF POSITIONING SEALING DEVICE FOR USE THEREIN

BACKGROUND OF THE INVENTION

1. Field of the Invention

The present invention relates to tanks thermally insulated with polymer foam, particularly water heaters. More particularly, the present invention relates to improved foam dams for use in constructing such insulated tanks.

Insulated tanks, particularly water heaters, as contemplated herein typically comprise a cylindrical water storage tank, a cylindrical shell coaxial with and radially spaced apart from the tank to form an annular space there between, and polymer foam insulating material in at least a portion of the annular space to provide thermal insulation for the tank. Polymer foam expanded directly in the annular space in particularly effective insulating material. A variety of polymer foams, such as epoxy foams and polyolefin foams, have been suggested and used as insulating material for water heaters. However, polyurethane foam is particularly preferred and widely used for the purpose. Employing methods well understood, and widely applied, by those skilled in the art of manufacturing water heaters, polymer reactant compositions are readily reacted in place within a portion of the annular space between the tank and shell to form polyurethane foam which expands to fill the space available to it. Briefly, a polyol resin-foaming agent mixture is brought into intimate contact with an isocyanate compound to form a liquid reaction mixture in the annular space between the tank and the shell. The isocyanate and polyol react in the presence of a catalyst, such as atmospheric moisture, to form polyurethane polymer in an exothermic reaction. The heat of reaction causes the foaming agent (a low boiling liquid such as FREON II) to vaporize. The vaporizing foaming agent causes the polymerizing liquid reaction mixture to froth and, as the polymerization reaction progresses, the froth becomes an expanding polymer foam. The polymer foam is initially fluid and quite sticky, and expands to fill substantially all the space between the tank and shell which is available to it. As the polymerization reaction continues to completion, the polyurethane polymer becomes stiff and the foam stabilizes into a rigid, closed-cell foam which fills the annular space surrounding the tank, and forms thermal insulation therefore. The amount of liquid polymer reactant composition injected into an annular space is selected, according to methods known to those skilled in the art, to ensure that the annular space is filled with polymer foam without creating an over pressure in the space.

Tanks, especially water heater tanks, have various appurtenances such as inlet, outlet, and drain fittings. Additionally, water heater tanks are provided with water heating and temperature control means. For example, a typical gas fired water heater is provided under the bottom with a heating chamber. A gas burner is placed in the heating chamber and water in the tank is heated with flame from the burner. Thus the burner has an open flame, and the heating chamber is hot. Sensors for thermostatic burner controls are placed within the interior of the tank through an opening in the tank wall provided therefore.

Polymer foams generally are flammable and if used as insulation for a water heater tank must be kept away from the heating element, such as the heating chamber and burner of a gas fired water heater. Polyurethane, in addition to being flammable, may emit toxic fumes upon combustion. Consequently, to avoid combustion hazards, polymer foam insulation material must be kept well away from hot surfaces, such as the heating chamber and burner associated with the water heater tank.

Over the years methods and devices have been developed in constructing water heaters for sealing an upper portion of an annular space, where expanding foam is to be placed, from a lower portion of the annular space near where the heating chamber and burner are located. Commonly, a foam dam device is placed in the annular space between the tank and shell at a selected position along the height of the cylindrical tank wall. The foam dam is in compressive sealing engagement with both the cylindrical inner wall of the shell and the cylindrical outer wall of the tank. Thus, the foam dam, and the upper portions of the shell wall and tank wall define an annular chamber. A liquid polymer reaction mixture is injected into the annular chamber and allowed to foam in place, to generate a thermally insulating jacket of polymer foam around the tank. The foam dam, in compressive sealing engagement with the walls of the tank and the shell, prevents the fluid foaming material from entering the lower portion of the annular space and from coming into contact with the heating chamber or burner.

A variety of foam dam devices have been proposed for such use in water heaters. These foam dams are generally either ring-shaped or have an elongated, flexible structure which can be wrapped into a ring shape.

U.S. Pat. No. 4,372,028, Clark et al, Feb. 8, 1983 discloses an elongated, flexible, expandable bag secured around the bottom edge of a tank. The bag is filled with a polymer reaction mixture and the shell is placed around the tank. The reaction mixture forms and expands to fill the bag which forms a collar which seals the space between the tank and a shell.

U.S. Pat. No. 4,447,377, to Denton, May 8, 1984, discloses a cylindrical envelope having a closed bottom and open top placed in the annular space between a cylindrical tank and a cylindrical shell, a polymer reaction mixture is placed in the envelope and is allowed to expand into a foam jacket surrounding the tank. The closed bottom of the envelope prevents the foam from contacting the heating chamber at the bottom of the tank.

U.S. Pat. No. 4,477,399, Tilton, Oct. 16, 1984, discloses an inflatable tube placed around the wall of a cylindrical tank. The tube is maintained at a desired elevation around the tank by either resting upon a stop member or by a stretch fit with the outer wall of the tank. A cylindrical shell is placed around the tank and tube, and the tube is inflated to form a seal between the shell and tank walls. The space above the tube is filled with expanding polymer foam. After use, the tube is deflated and, as desired, may be removed or left in place.

U.S. Pat. No. 4,979,637, Dec. 25, 1990 and U.S. Pat. No. 5,024,210, Jun. 18, 1991 and their divisional and parent applications, all to Nelson, disclose a sleeve of insulation material, such as fiberglass mat, around the lower portion of a cylindrical tank. The upper end of the sleeve is folded back upon itself to form a cuff. A cylindrical shell is placed concentrically around the tank such that the cuff is compressed between the shell and the tank, thus forming a seal in the annular space. A liquid polymer reaction mixture is injected into the annular space above the seal and is allowed to foam in place around the tank. The lower portion of the fiberglass sleeve insulates the lower portion of the tank.

U.S. Pat. No. 4,875,272, Oct. 24, 1989, U.S. Pat. No. 4,956,909, Sep. 18, 1990 and their divisions, all to Nelson, disclose an insulating and sealing device of insulation material, such as fiberglass or foamed material partially enclosed in an open-topped envelope of plastic or foil. The device is wedged-shaped in cross section, and the widest part of the wedge has a radial thickness greater than the width of the annular space, The device radially compressed between the wall of the tank and the wall of the shell. The sealing device is either an elongated member which is wrapped around the tank and held in place, as with an adhesive, or is a toroidial shaped member which is pushed into the annular space between the tank and the shell and held in place by compression against the walls of the tank and the shell.

U.S. Pat. No. 4,878,482, Pfeffer, Nov. 7, 1989, discloses a prefabricated bottom wall, such as styrofoam, in the annular space between a tank and shell. The styrofoam held in place at a selected elevation along the tank wall with an adhesive. The bottom wall has an outer sealing portion that is either integral with the body, or is a separate element affixed to the body. The outer sealing portion has sufficient compression or deflection to produce a seal in response to positioning the shell about the tank. The outer sealing portion may be material such as fiberglass or resilient polymer foam.

U.S. Pat. No. 4,890,762, Pfiffer, Jan. 2, 1990, discloses a flange extending from the lower portion of a tank into the annular space between the tank and a shell. A foam dam of flexible resilient material, such as fiberglass mat, is fixed around the tank and, in association with the flange, forms a seal in the annular space at the elevation of the flange.

U.S. Pat. No. 4,972,967, Nelson, Nov. 27, 1990, discloses a water heater construction including an inner tank surrounded in spaced apart relationship by an outer shell. An outer collar of insulation material is located in the annular space between the inner tank and shell at a preselected location along the height of the tank. The collar has a radial thickness greater than the radial width of the annular space and is compressed between the interior wall of the shell and the outer wall of the tank. The collar is either fixed in place prior to assembly of the tank and shell, or is pushed into the annular space between the tank and shell. Conveniently, stop means are used to maintain the collar at its preselected position in the annular space. The annular collar may be of compressible materials such as open cell polyurethane; closed cell foam; fiberglass; polyethylene envelopes of compressible materials; and other compressible materials.

U.S. Pat. No. 5,040,697, Aug. 20, 1991, to Nelson, discloses a water heater construction including an inner tank surrounded in spaced apart relationship by an outer shell. An outer collar of insulating material is located in the annular space between the tank and the shell. The collar has a radial thickness greater than the radial width of the annular space, and in one embodiment comprises a hollow tube of compressible material, such as polyurethane foam, formed into a ring-shaped collar. The collar is positioned in the annular space by being pushed down to its preselected location. A stop may be used in the annular space to locate the collar being pushed in, and the collar may be lubricated to ease the force necessary to push it.

While these collar and sleeve devices have been proposed, and some have been used commercially, as foam dams in construction of insulated tanks such as water heaters, a need continues to exist for an inexpensive foam dam device which is easy to use and may be accurately placed within an annular space between the tank and shell of a water heater or other insulated tank construction.

SUMMARY OF THE INVENTION

The present invention provides an improved foam dam device which is simple and inexpensive to manufacture and which is easy and effective to use in construction of polymer foam insulated water heaters, and other insulated tanks.

Particularly, the present invention provides a foam dam device for use in the annular space between a cylindrical tank and a concentric outer shell, which foam dam device comprises a ring-shaped body of resilient, compressible material in compressive engagement with the outer wall of the tank and the inner wall of the shell and which body will roll along the tank wall from an initial position to a selected final position as the shell is moved longitudinally with respect to the tank in a process of assembly.

More particularly, the present invention provides a foam dam device comprising a ring-shaped body of resilient compressible material which, when placed around and in compressive engagement with the outer cylindrical wall of a tank at an initial position and compressively engaged by the inner wall of a cylindrical shell being moved longitudinally into a coaxial, radially spaced apart position surrounding the tank, will roll down the wall of the tank and reach a final position with respect to the tank and the shell when the shell reaches its final position with respect to the tank.

DESCRIPTION OF THE PREFERRED EMBODIMENTS

An embodiment of the present invention particularly useful in gas fired water heaters will be described herein. It is, however, understood that no limitation of the scope of the invention is hereby intended and that such further applications and embodiments of the invention are contemplated as would occur to one skilled in the art to which the invention pertains.

The foam dam of the present invention are intended for use in insulated tank constructions, particularly, gas fired water heaters which comprise a cylindrical tank and a cylindrical shell coaxial with an radially spaced apart from the outer wall of the tank to form an annular space there between. A foam dam device is positioned circumferentially the annular space between the tank an shell in sealing engagement with both the outer wall of the tank and the inner wall of the shell, thus separating an annular chamber portion from the remainder of the annular space. The annular chamber may then be filled with an expandable polymer foam material which forms a jacket of insulating foam around the tank.

Figure 1:
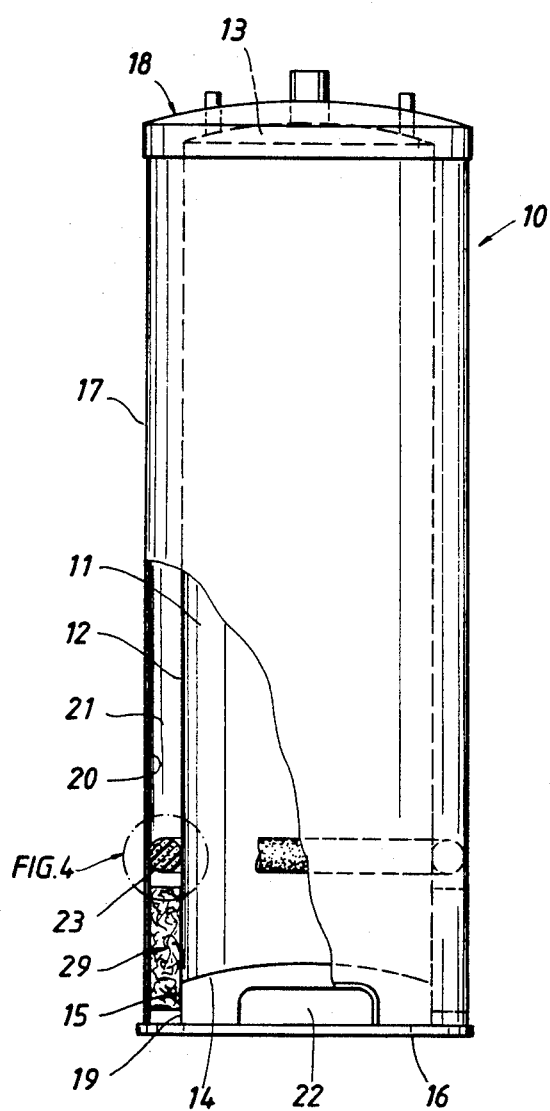
FIG. 1 is a schematic representation of a water heater in elevation, with a partial cut-away section to show a typical embodiment of the present invention.

FIG. 1 is a schematic representation of a gas fired water heater, generally at 10, having a foam dam 23 of the present invention employed in its construction.

In FIG. 1 a cylindrical tank 11, having an outer cylindrical wall 12, a top 13 and a bottom 14, rest upon a support ring 15. Support ring 15, in turn, rests upon support plate 16.

In FIG. 1 a cylindrical shell 17, having a top 18, a bottom edge 19 and an inner wall 20, is coaxial with and radially spaced apart from tank 11, thus forming an annular space 21 between inner shell wall 20 and outer tank wall 12. The shell bottom edge 19 rests upon support plate 16. The shell nottom edge 19 and support ring 15 each define openings which are in register with each other for providing access to a heating chamber 22 located under tank bottom 14. Conventionally, a gas burner, not shown, is located within the heating chamber 22. A skirt 29 of non-flammable insulating material, such as fiberglass mat is located in annular space 21 and surrounds the lower portion of tank 11 providing both thermal insulation and non-flammable barrier between heating chamber 21 and upper portion of annular space 21.

In FIG. 1 a ring-shaped, resilient, compressible foam dam 23 is disposed in annular space 21 circumferentially around tank 11. Foam dam 23 is in compressive sealing engagement with outer tank wall 12 and inner shell wall 20, thereby forming a seal in annular space 21 to separate the lower portion from the upper portion thereof. The portion of annular space 21 above foam dam 23 may be filled with an expanded polymer foam insulating material for thermal insulation of the upper portion of tank 11. Such polymer foam material is generally flammable, and as in the case of polyurethane foam, may produce toxic gasses when burned. Foam dam 23, in sealing engagement with tank wall 12 and shell wall 20 prevents the polymer foam from expanding into the lower portion of annular space 21, where the foam could come into contact with heating chamber 22 and the burner flame.

The foam dam 23 of the present invention is shown in more detail in FIGS. 2, 3, 4 and 5 of the present invention. Common elements illustrated in FIGS. 1 through 5 all have the same reference numeral to make comparison easier.

Figure 2:
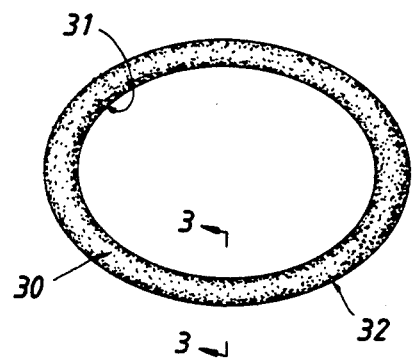
FIG. 2 is an isometric view of an embodiment of the foam dam device of the present invention.

In FIG. 2, foam dam 23, shown in isometric view, comprises a ring shaped body 30 of resilient, compressible material, having an inner circumferential portion 31 and an outer circumferential portion 32.

Figure 3:
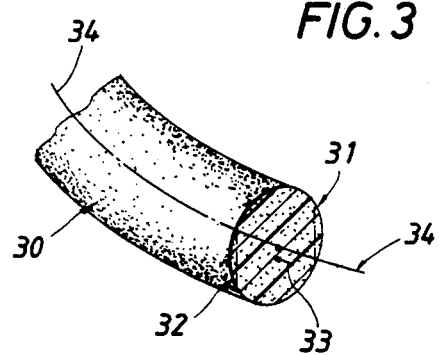
FIG. 3 is section a—a of FIG. 2, showing details of the foam dam device. tank outer wall and shell inner wall.

In FIG. 3, which is section "A—A" of FIG. 2, ring shaped body 30 has a uniform cross-section 33 and a circumferential axis 34. Body cross-section 33 is substantially symmetrical about circumferential axis 34.

Figure 4:
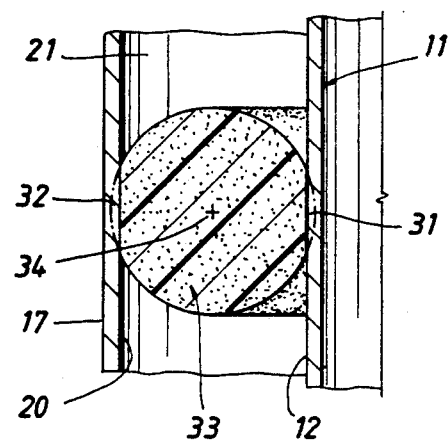
FIG. 4 is detail "A" of FIG. 1, showing a sectional view of the foam dam device in association with the water heater tank outer wall and shell inner wall.

FIG. 4 is detail "A" of FIG. 1 showing foam dam 23 in compressive engagement between shell wall 20 and tank wall 12. In FIG. 4, body 30 is located in annular space 21 between tank outer wall 12 and shell inner wall 20. The circumferetiale portion 31 of body 30 is less than the circumference of cylindrical tank wall 12, such that inner circumferential portion 31 is compressed when body 30 is placed around tank 11. The relationship of the uncompressed inner circumferential portion 31 to tank wall 12 is illustrated by ghost lines.

In FIG. 4, the circumference of circumferential portion 32 of body 30 is greater than the circumference of inner tank wall 20, such that outer circumferential portion 32 is compressed into sealing engagement with shell wall 20 when shell 17 is placed coaxially around tank 11. The uncompressed dimensions of outer circumferential portion 32 are shown relative to shell wall 20 by ghost lines.

In FIG. 5, cross-section 33 of body 30 may have a variety of circular or polygonal shapes which are substantially symmetrical about circumferential axis 34 as shown.

Figures 5A, 5B, 5C:
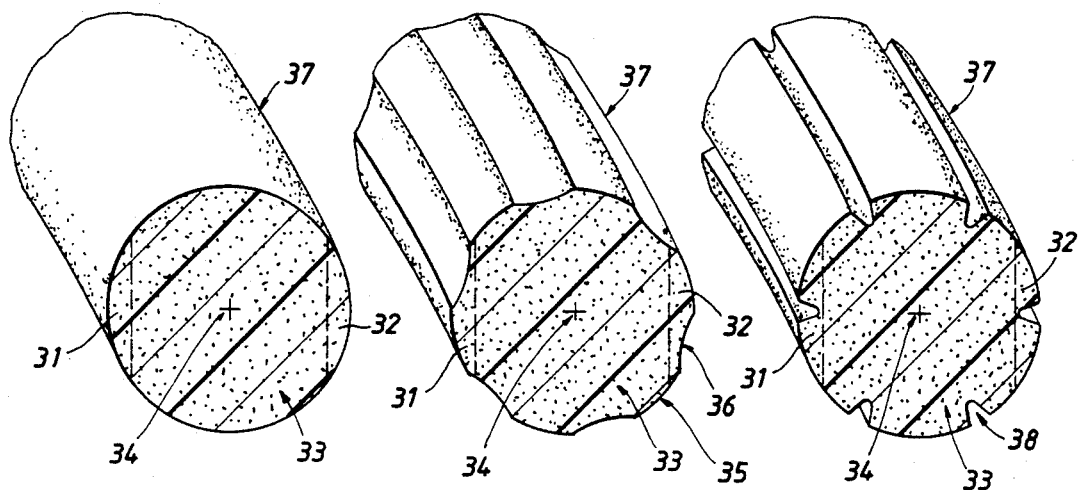
FIGS. 5a to 5c are a schematic representation of three shapes the cross-section of the foam dam may take.

FIG. 5A shows a circular cross section 3, 5B shows a cross section 33 with scalloped portions 36 and circular portion 35 and 5C shows circular cross section 33 with notched positions 38.

In FIG. 5, the cross-section 33 selected for body 30 is of uniform diameter around the ring of body 30. Preferably, portions, as scallops 36 or notches 38, in the periphery of cross-section 33 will not extend inwardly toward the center of body 33 deeper nor around the periphery further than the depth and width of inner circumferential portion 31 and outer circumferential portion 32 which, as shown in FIG. 4, are in compressive engagement with, respectively, tank wall 11 and shell wall 20.

Thus, from the above, foam dam 23 of the present invention comprises a ring-shaped body 30 of resilient, compressible material which has an inner circumference smaller than the circumference of tank wall 12 and an outer circumference larger than the circumference of shell inner wall 20, and body 30 has a uniform cross-section which is substantially symmetrical about the body circumferential axis 34.

According to the present invention, ring shaped body 30 is made of a resilient, compressible material which will allow body 30 to rotate easily about its circumferential axis 34, when body 30 is compressed in annular space 21 between tank wall 12 and shell inner wall 20. Thus, when shell 17 is moved longitudinally with respect to tank 11 body 30 will rotate about its circumferential axis 34, and will roll down the wall of tank 11. Further, when shell 17 and tank 11 are not moving longitudinally with respect to one another, body 30 will remain in position in annular space 21, held in place by the compressive force of inner portion 31 with tank wall 12 and of outer portion 32 with shell inner wall 20.

The material from which body 30 may be made according to this invention is a resilient, compressible material, such as rubber foam or open cell polymer foam, which will allow body 30 to rotate easily about its circumferential axis 34. As body 30 rotates, the geometric positions of inner circumferential portion 31 and outer circumferential portion 32 remain constant with respect to body 30 as a whole. However, due to the rotation, the material of body 30 which comprises inner circumferential portion 31 and outer circumferential portion 32 changes constantly. Consequently, the material of body 30 must have the capacity to compress and then expand to accommodate itself to the various portions of body 30 through which the material will rotate. Body 30, when compressed between tank wall 12 and shell wall 20, will substantially deform only in the area of inner circumferential portion 31 and outer circumferential portion 32, leaving the remainder of body 30 substantially uncompressed. Body 30 may be foam throughout or may have openings within its interior. Preferably, body 30 is comprised of light to medium density polyurethane foam throughout. Specifically, the body 30 may be is comprised of resilient, compressible polyurethane foam with density of about 1.7 pounds per cubic foot.

In FIGS. 2 and 3, cross section 33 has a uniform diameter about the entire ring of body 30, and is symmetrical about circumferential axis 34, all sufficient for ring-shaped body 30 to remain in a plane normal to the axis of cylindrical tank 11 as body 30 rolls down tank wall 12. Non-uniformities and unsymmetries in cross section 33 tend to cause one side of body 30 to advance faster than another side, such that body 30, as it rolls, becomes mis-aligned on tank wall 12. In the preferred embodiment, where body 30 comprises a foam dam 23 in a water heater 10, the diameter of cross-section 34 is preferably about one half inch greater than the width of annular space 21 and circumference of body 30 at its circumferential axis 34 is about one inch less than the circumference of tank wall 12, when the material is the preferred open cell polyurethane foam. For the embodiments, the preferred dimensions of body 30 may change. Selecting a preferred dimension is a matter of routine effort of trying various dimensions until preferred ones are determined.

Cross section 33 is substantially symmetrical about circumferential axis 34. As the cross-section becomes increasingly unsymmetrical, body 30 will have increasing difficulty rolling and at some point of un-symmetry, body 30 will cease to roll. Thus, according to the invention, cross-section 33 is symmetrical to a degree which will allow body 30 to roll easily down cylindrical wall 12 of tank 11.

A cross-section 33 with a many sided or polygonal periphery has advantages over a circular periphery in some cases, always provided that body 30 can rotate easily about its circumferential axis 34. A many sided cross-section 33 will have circumferential bands of different radial dimensions. FIG. 5B and C show two such configurations, respectively, a scallop circle and a notched circle. The advantage of a many sided cross-section 33 is described with reference to FIG. 5B.

In FIG. 5B, the periphery of cross-section 33 comprises circular portions 35 and scallop portions 36. With scalloped portions 36 in contact with tank wall 12, or shell wall 20, body 30 is more stable and resists rolling compared to its condition when circular portion 35 is in contact with wall 12. Thus, irregularities in the surfaces of tank wall 12 or shell wall 20, or for that matter, in the surface of body 30, may cause body 30 to become twisted and segments 37 of body 30 to become misaligned as body 30 rolls along tank wall 12. When a part of scallop portion 36 comes into contact with tank wall 12, that segment 37 will tend to cease rotation until the scallop portion 36 of all other segments 37 of body 30 also contacts tank wall 12. Then, rotation of body 30 will continue. This tendency of the scallop portions 36 polygonal cross-section 34 to maintain their alignment helps maintain the alignment of the entire body 30 with respect to the tank wall 12 and the shell wall 20.

In construction, body 30 is made of a resilient, compressible material. Body 30 may be a torroidial shaped member, or preferably is a length of material formed into a ring. In the preferred embodyment, where body 30 comprises open cell polyurethane foam, an elongated cylinder of foam is cut from a bun of polyurethane foam, and the ends of the cylinder are attached to each other with adhesive, such as rubber cement, to form the ring shape.

Figures 6A, 6B, 6C:
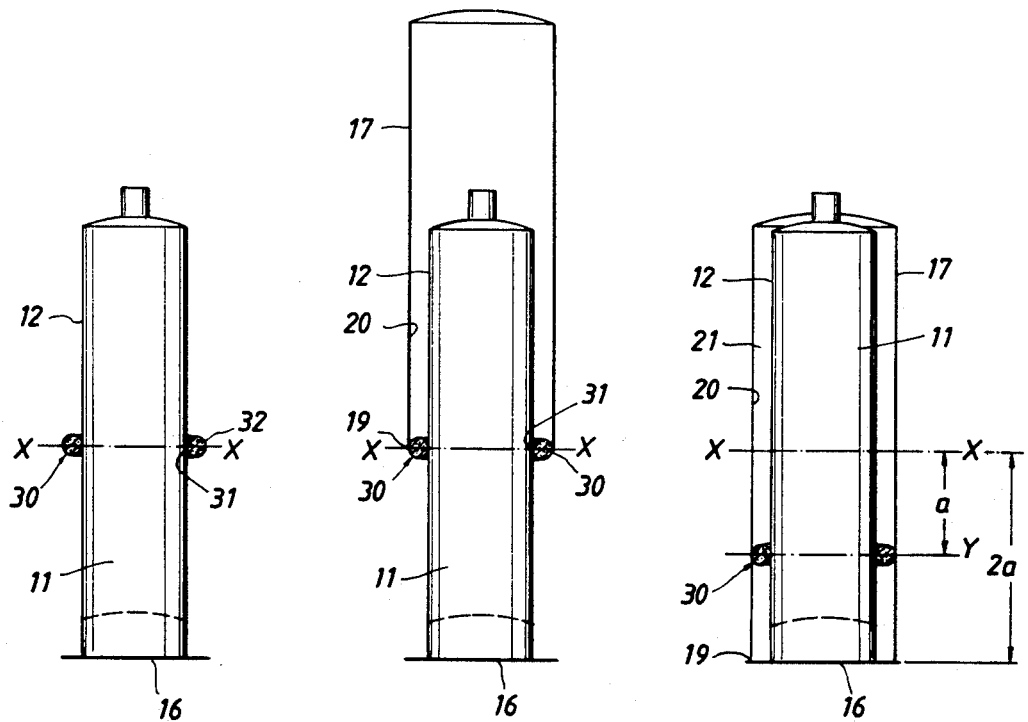
FIGS. 6a to 6c are a schematic representation of a water heater in three stages of assembly using the foam dam of the present invention.

The movement and positioning of ring-shaped body 30 in response to relative movement of shell 17 and tank 11 with respect to each other is illustrated in FIGS. 6A, 6B, and 6C described below. FIGS. 6A, 6B and 6C are three schematic views, in section, showing assembly of tank 11, foam dam 23 and shell 17 employing the novel properties of body 30 of the present invention. The same identifying numerals will be used in FIG. 6 as in FIGS. 1-5 for elements described to aid in comparisons.

In FIG. 6A, a foam dam 23 comprises body 30, having an inner circumferential portion 31 and an outer circumferential portion 32, around cylindrical outer wall 12 of tank 11 at an initial elevation "X". Inner circumferential portion 31 of body 30 is in compressive engagement with tank outer wall 12, such that body 30 is held in place at position "x" by compressive force.

In FIG. 6B, cylindrical shell 17, having inner wall 20 and a lower edge 19, is lowered coaxially around tank 11 until inner wall 20 at bottom edge 19 compressively engages outer circumferential portion 32 of body 30 at position "X".

In FIG. 6C, shell lower edge 19 is lowered longitudinally with respect to tank 11 a distance "2a" from position "x" to rest upon support plate 16. As shell bottom edge 19 moves the distance 2a, body 30 rolls down tank wall 12 in annular space 21 a distance "a" in response to the relative movement between shell 17 and tank 11. When the bottom edge 19 of shell 17 comes to rest upon support plate 16, and relative motion of shell 17 to tank 12 ceases, the rolling motion of body 30 ceases at mew [psotopm "Y". Body 30 is held in place in annular space 21 at new position "y" by compressive forces between the body 30 inner 31 and outer 32 circumferential portions with tank outer wall 12 and shell inner wall 20.

In FIG. 6, referring to FIG. 1 and FIG. 6, installation of body 30 as foam dam 23 in water heater 10 is accomplished as follows. The final position "y" where a foam dam 23 is desired is marked on tank wall 12. The distance from "y" to of support plate 16 is measured. The measured distance is equivalent to the distance "a". An equivalent distance "a" is measured from position "y" up tank wall 12, and is marked as position "x". Body 30 is placed around tank 11 at position "x". Shell 17 is lowered coaxially around tank 11 until shell wall 20 at lower edge 19 is in compressive engagement with body 30 at position "x". Shell 17 is then lowered the distance "2a" until shell lower edge 19 rests upon support plate 16. As shell 17 is lowered the distance "2a", body 30 rolls down wall 12 of tank 11 a distance "a" to position "y". At position "y" body 30 becomes foam dam 23 sealing the upper portion of annular chamber 21 from the heating chamber 22, and gas burner located at the bottom of tank 11.

A liquid polymer reaction mixture may be injected into the annular chamber 30 and allowed to expand, forming a polymer foam insulation. For example, a polyol-forming agent mixture is mixed with an isocyanate to form the polymer reaction mixture which is injected into the upper portion of annular chamber 21. The liquid mixture runs down onto foam dam 23 which comprises body 30 made of open-cell polyurethane foam. The polyol and isocyanate begin to polymerize, generating heat which causes the foaming agent to vaporize. The vaporizing foaming agent causes the polymerizing materials to foam. Initially, air and other displaced gasses can escape annular chamber 21, at least partially through the open cells of foam body 31, thereby preventing undue pressure buildup in annular chamber 21. The polyurethane foam generated by the reaction mixture is initially fluid and quite sticky and foam expands to fill the upper portion of space 21. As the polymerization reaction nears completion, the foam in annular space 21 surrounding tank 11 becomes rigid.

Although preferred embodiments of the invention have been described here in detail, it will be understood by those skilled in the art that variations may be made to the preferred embodiment without departing from the spirit of the invention or scope of the appended claims.

I claim:

1. An insulated tank assembly comprising:
    a cylindrical tank having an outer wall and a central axis:
    a cylindrical shell having an inner wall coaxial with and radially spaced apart from the cylindrical tank for forming an annular space between the walls of the tank and the shell; and
    a foam dam comprising a ring-shaped body of resilient, compressible material circumferintially disposed within the annular space, in a plane normal to the central axis of the tank, and in sealing engagement with the shell inner wall and the tank outer wall, defining an annular chamber for receiving foam insulation in the upper portion of the annular space, wherein the ring-shaped body comprises:
    an inner circumferential portion with a circumference less than the circumference of the tank outer wall; and
    an outer circumferential portion with a circumference greater than the circumference of the shell inner wall;
    such that when the ring-shaped body is disposed about the cylindrical tank in the annular space between the tank and the shell, the inner circumferential portion is compressed against the tank wall and the outer circumferential portion is compressed against the shell inner wall to form a liquid seal in the annular space without substantially deforming the cross section of the uncompressed portion of the body which is not in contact with either of the walls,
    and wherein the ring-shaped body further comprises:
    a circumferential axis;
    and a many sided cross-section substantially symmetrical about the circumferential axis; and
    circumferential bands of different radial dimensions, such that the ring shaped body will rotate about its circumferential axis and roll, in the annular space, in a plane normal to the tank central axis without substantial twist or misalignment, with respect to both the shell inner wall and the tank outer wall responsive to the longitudinal movement of the shell relative to the tank.

2. The insulated tank assembly of claim 1, wherein the compressed inner circumferential portion is flattened against the tank wall, wherein the compressed outer circumferential portion is flattened against the shell wall, and wherein each circumferential band of the ring-shaped body has a width no greater than the width of the flattened portion of either the inner or outer circumferential portions.

3. The foam dam of claim 2, wherein the ring-shaped body has circumferential bands of scalloped cross-section.

4. The foam dam of claim 3, wherein the depth of each scallop is no greater than the depth of the compressed portions of either the inner or the outer circumferential portions.

5. The foam dam of claim 2, wherein the ring-shaped body has notched circle circumferential bands.

6. The foam dam of claim 5, wherein the depth of each notch is not greater than the depth of the compressed portion of either the inner or the outer circumferential portion.

7. The insulated tank assembly of claim 2: wherein the assembly is a gas fired hot water heater; wherein the ring-shaped body is comprised of resilient, compressible, open cell polyurethane foam having a density of about 1.7 pounds per cubic foot, has an inner circumferential portion of length about one inch less than the circumference of the cylindrical tank, and has a diameter about one-half inch greater than the width of the annular space.

8. A foam dam for sealing an annular space between an outer wall of a cylindrical tank having a central axis and an inner wall of a cylindrical shell coaxially surrounding the tank and forming the annular space therebetween, which foam dam comprises a resilient, compressible, ring-shaped body having:
    an inner circumferential portion with a circumference less than the circumference of the tank wall, wherein the inner circumferential portion is suitable for sealing engagement with the tank wall when the ring-shaped body is placed around the tank in a plane normal to the central axis;
    an outer circumferential portion with a circumference greater than the circumference of the shell wall, wherein the outer circumferential portion is sealing engagement with the shell wall when the shell is placed coaxially around the tank;
    a circumferential axis;
    a many sided cross-section substantially symmetric about the circumferential axis for providing the ring-shaped body with circumferential bands of different radial dimensions,
    such that the ring-shaped body will rotate about its circumferential axis and bring successive circumferential bands into position as the inner circumferential portion or the outer circumferential portion, and when installed in the annular space, will roll along the wall of the tank in a plane normal to the central axis without substantial misalignment or twist, when the shell is moved longitudinally with respect to the tank.

9. The foam dam of claim 8, wherein the width of each circumferential band of the ring-shaped body has a width no greater than the width of either the inner circumferential portion or the outer circumferential portion which is in compressive engagement with, respectively, the tank wall or the shell wall.

10. The foam dam of claim 8 wherein the ring-shaped body has a scalloped cross-section defining scalloped circumferential bands, each scallop of which does not extend inwardly toward the center of the body deeper, or around the periphery farther than the depth and width, respectively, of either the body's compressed inner circumferential portion or the body's compressed outer circumferential portion.

11. The foam dam of claim 8 wherein the body cross-section has a notched circle cross section defining notched circle circumferential bands, each notch of which does not extend inwardly toward the center of the body deeper, or around the periphery farther than the depth and width, of either the body's compressed inner circumferential portion or the body's compressed outer circumferential portion.

12. The foam dam of claim 9, wherein the ring-shaped body is comprised of open-cell polyurethane foam having a density of about 1.7 pounds per cubic foot, has an inner circumferential portion with length about one inch less than the circumference of the cylindrical tank, and has a diameter about one-half inch greater than the width of the annular space.

* * * * *

UNITED STATES PATENT AND TRADEMARK OFFICE
CERTIFICATE OF CORRECTION

PATENT NO.  : 5,209,368

DATED       : May 11, 1993

INVENTOR(S) : Kenneth A. Bradenbaugh

It is certified that error appears in the above-identified patent and that said Letters Patent is hereby corrected as shown below:

Col. 8, lines 36 & 37: Delete --mew!psotopm"Y"--, and insert therefor the phrase --new position "Y"--.

Signed and Sealed this

Eighth Day of February, 1994

Attest:

BRUCE LEHMAN

Attesting Officer

Commissioner of Patents and Trademarks